US00RE40066E

(19) United States
(12) Reissued Patent
Ward

(10) Patent Number: US RE40,066 E
(45) Date of Reissued Patent: Feb. 19, 2008

(54) MULTI-LAYER FORMING FABRIC WITH STITCHING YARN PAIRS INTEGRATED INTO PAPERMAKING SURFACE

(75) Inventor: Kevin John Ward, Coldbrook (CA)

(73) Assignee: Weavexx Corporation, Wake Forest, NC (US)

(21) Appl. No.: 09/982,917

(22) Filed: Aug. 21, 2002

Related U.S. Patent Documents

Reissue of:
(64) Patent No.: 5,967,195
Issued: Oct. 19, 1999
Appl. No.: 08/905,130
Filed: Aug. 1, 1997

(51) Int. Cl.
*D03D 11/00* (2006.01)
*D03D 13/00* (2006.01)

(52) U.S. Cl. ..... 139/383 A; 139/383 AA; 139/383 R

(58) Field of Classification Search ..... 139/383 A, 139/383 AA, 383 R, 408, 409
See application file for complete search history.

(56) References Cited

U.S. PATENT DOCUMENTS

| | | | | | |
|---|---|---|---|---|---|
| 3,325,909 | A | * | 6/1967 | Clark | 34/95 |
| 4,501,303 | A | * | 2/1985 | Osterberg | 139/425 A |
| 4,605,585 | A | * | 8/1986 | Johansson | 442/2 |
| 4,739,803 | A | * | 4/1988 | Borel | 139/383 A |
| 4,759,975 | A | * | 7/1988 | Sutherland et al. | 442/203 |

(Continued)

FOREIGN PATENT DOCUMENTS

| | | | |
|---|---|---|---|
| DE | 454 092 | * | 8/1927 |
| DE | 454092 | * | 8/1927 |
| EP | 0 224 276 | * | 12/1986 |
| EP | 0224276 | * | 12/1986 |
| EP | 0408040 A2 | * | 11/1990 |
| EP | 0 408 849 A2 | * | 11/1990 |
| EP | 0 408 849 A3 | * | 11/1990 |

(Continued)

OTHER PUBLICATIONS

International Search Report for PCT Application No. PCT/US97/18629.*

*Primary Examiner*—Gary L. Welch
*Assistant Examiner*—Robert H. Muromoto, Jr.
(74) *Attorney, Agent, or Firm*—Myers Bigel Sibley & Sajovec

(57) ABSTRACT

A multi-layer papermaker's forming fabric has stitching yarns integrated into the papermaking surface. Each of a plurality of repeating units of the fabric comprises: a set of top machine direction yarns; a set of top cross-machine direction yarns interwoven with the top machine direction yarns; a set of bottom machine direction yarns; a set of bottom cross-machine direction yarns interwoven with the bottom machine direction yarns; and pairs of first and second stitching yarns. The stitching yarns pairs are positioned between pairs of top cross-machine direction yarns. The stitching yarns of each pair are interwoven with the top and bottom machine direction yarns such that, as a fiber support portion of the first stitching yarn is interweaving with the top machine direction yarns, a binding portion of the second stitching yarn is positioned below the top machine direction yarns, and such that as a fiber support portion of the second stitching yarn is interweaving with the top machine direction yarns, a binding portion of the first stitching yarn is positioned below the top machine direction yarns. The first and second stitching yarns cross each other as they pass below a traditional top machine direction yarn. Also, each of the binding portions of the first and second stitching yarns passes below at least one of the bottom machine direction yarns. In this configuration, the stitching yarns are completely integrated into the top, or papermaking, surface of the fabric, and therefore do not adversely impact the papermaking qualities of the fabric.

39 Claims, 6 Drawing Sheets

U.S. PATENT DOCUMENTS

| | | | | | |
|---|---|---|---|---|---|
| 4,987,929 | A | * | 1/1991 | Wilson | 139/383 A |
| 5,152,326 | A | * | 10/1992 | Vohringer | 139/383 A |
| 5,518,042 | A | * | 5/1996 | Wilson | 139/383 A |
| 5,564,475 | A | * | 10/1996 | Wright | 139/383 A |
| 5,709,250 | A | * | 1/1998 | Ward et al. | 139/383 A |
| RE35,777 | E | * | 4/1998 | Givin | 139/383 A |
| 5,826,627 | A | * | 10/1998 | Seabrook et al. | 139/383 A |

FOREIGN PATENT DOCUMENTS

| | | | |
|---|---|---|---|
| EP | 0408040 A3 | * | 11/1991 |
| EP | 0 794 283 | * | 9/1997 |
| EP | 0794283 | * | 9/1997 |
| FR | 2 597 123 | * | 10/1987 |
| FR | 2597123 | * | 10/1987 |
| WO | WO86/00099 | * | 3/1986 |
| WO | WO 86/00099 | * | 3/1986 |

* cited by examiner 21 22 23 24 25 26 27 28 29 30
61b
IB
IB
61a 62a
62b 63a
63b 64a
64b 65a
65b 66b
66a 67b
67a 68b
68a 69a
69b 70a
70b
50
41 42 43 44 45 46 47 48 49

181a
101 102 103 104 105 106 107 108 109 110 111 112

3B
181b
3B
182b
182a 183b
183a 184b
184a 185b
185a 186b
186a 187b
187a 188b
188a 189b
189a 190b
190a 191b
191a 192a
192b 141 142 143 144 145 146 147 148 149 150 151 152

MULTI-LAYER FORMING FABRIC WITH STITCHING YARN PAIRS INTEGRATED INTO PAPERMAKING SURFACE

Matter enclosed in heavy brackets [ ] appears in the original patent but forms no part of this reissue specification; matter printed in italics indicates the additions made by reissue.

FIELD OF THE INVENTION

The present invention relates generally to papermaking, and relates more specifically to fabrics employed in papermaking.

BACKGROUND OF THE INVENTION

In the conventional fourdrinier papermaking process, a water slurry, or suspension, of cellulosic fibers (known as the paper "stock") is fed onto the top of the upper run of an endless belt of woven wire and/or synthetic material that travels between two or more rolls. The belt, often referred to as a "forming fabric," provides a papermaking surface on the upper surface of its upper run which operates as a filter to separate the cellulosic fibers of the paper stock from the aqueous medium, thereby forming a wet paper web. The aqueous medium drains through mesh openings of the forming fabric, known as drainage holes, by gravity or vacuum located on the lower surface of the upper run (i.e., the "machine side") of the fabric.

After leaving the forming section, the paper web is transferred to a press section of the paper machine, where it is passed through the nips of one or more pairs of pressure rollers covered with another fabric, typically referred to as a "press felt." Pressure from the rollers removes additional moisture from the web; the moisture removal is often enhanced by the presence of a "batt" layer of the press felt. The paper is then transferred to a drier section for further moisture removal. After drying, the paper is ready for secondary processing and packaging.

Typically, papermaker's fabrics are manufactured as endless belts by one of two basic weaving techniques. In the first of these techniques, fabrics are flat woven by a flat weaving process, with their ends being joined to form an endless belt by any one of a number of well-known joining methods, such as dismantling and reweaving the ends together (commonly known as splicing), or sewing on a pin-seamable flap or a special foldback on each end, then reweaving these into pin-seamable loops. In a flat woven papermaker's fabric, the warp yarns extend in the machine direction and the filling yarns extend in the cross machine direction. In the second technique, fabrics are woven directly in the form of a continuous belt with an endless weaving process. In the endless weaving process, the warp yarns extend in the cross machine direction and the filling yarns extend in the machine direction. As used herein, the terms "machine direction" (MD) and "cross machine direction" (CMD) refer, respectively, to a direction aligned with the direction of travel of the papermakers' fabric on the papermaking machine, and a direction parallel to the fabric surface and traverse to the direction of travel. Both weaving methods described hereinbelow are well known in the art, and the term "endless belt" as used herein refers to belts made by either method.

Effective sheet and fiber support and an absence of wire marking are important considerations in papermaking, especially for the forming section of the papermaking machine, where the wet web is initially formed. Wire marking is particularly problematic in the formation of fine paper grades, as it affects a host of paper properties, such as sheet mark, porosity, see through, and pin holing. Wire marking is the result of individual cellulosic fibers being oriented within the paper web such that their ends reside within gaps between the individual threads or yarns of the forming fabric. This problem is generally addressed by providing a permeable fabric structure with a coplanar surface that allows paper fibers to bridge adjacent yarns of the fabric rather than penetrate the gaps between yarns. As used herein, "coplanar" means that the upper extremities of the yarns defining the paper-forming surface are at substantially the same elevation, such that at that level there is presented a substantially "planar" surface. Accordingly, fine paper grades intended for use in quality printing, carbonizing, cigarettes, electrical condensers, and like grades of fine paper have typically heretofore been formed on very finely woven or fine wire mesh forming fabrics.

Regretably, such finely woven forming fabrics often are delicate and lack dimensional stability in either or both of the machine and cross machine directions (particularly during operation), leading to a short service life for the fabric. In addition, a fine weave may adversely effect drainage properties of the fabric, thus rendering it less suitable as a forming fabric.

To combat these problems associated with fine weaves, multi-layer forming fabrics have been developed with fine-mesh yarns on the paper forming surface to facilitate paper formation and coarser-mesh yarns on the machine contact side to provide strength and durability. For example, fabrics have been constructed to include one fabric layer having a fine mesh, another fabric layer having a coarser mesh, and stitching yarns that bind the layers together. These fabrics, known as "triple layer" fabrics, are illustrated in U.S. Pat. No. 4,501,303 to Osterberg, U.S. Pat. No. 5,152,326 to Vohringer, and U.S. Pat. No. 5,437,315 to Ward.

Although these fabrics have performed successfully, they have some shortcomings that relate to the inclusion of the stitching yarns. In a typical triple layer forming fabric, one of more stitching yarns are positioned between some of the CMD yarns of the top and bottom layers and interwoven with the top and bottom MD yarns. In such a construction, portions of the stitching yarns form part of the papermaking surface of the fabric. As a result, the appearance of paper formed with the fabric can be affected (sometimes adversely) by the presence of the stitching yarns.

In addition, triple layer fabrics have proven to have problems with interlayer wear. As the fabric is used on a paper machine, the top and bottom layers tend to shift relative to one another, both in the machine direction and the cross machine direction, due to the tension imparted to the fabric by the rolls. This effect is exacerbated on paper machines, such as the so-called "high-wrap" machines, that include multiple rolls, including some which contact the top layer of the fabric. This shifting can cause the fabric to wear and decrease in thickness, which can adversely affect the drainage of the fabric and, accordingly, its performance in papermaking. In many instances, it is this interlayer wear, rather than the wear of the machine side surface of the fabric machine against the paper machine, that determines the longevity of the fabric.

Further, because the stitching yarns of a triple layer fabric have a different weave pattern than the top CMD yarns (i.e., they interweave with the bottom CMD yarns also, whereas the top CMD yarns to not), there can be differences in tension between the stitching yarns and the top CMD yarns.

These differences can induce the fabric to distort out-of-plane, which can in turn reduce the quality of paper produced with the fabric.

Also, the stitching yarns of a triple layer fabric should be sufficiently strong and durable to bind the top and bottom layers and to resist the wear and abrasion conditions that the bottom layer experiences while in contact with the paper machine, yet should be delicate enough to produce high quality paper. This balance can be quite difficult to strike.

SUMMARY OF THE INVENTION

In view of the foregoing, it is an object of the present invention to provide a multi-layer forming fabric construction with little distortion in the top fabric layer.

It is also an object of the present invention to provide a multi-layer forming fabric construction that produces a high quality paper.

It is another object of the present invention to provide a multi-layer forming fabric construction that maintains the top and bottom layers in a tightly bound condition.

It is a further object of the present invention to provide a multi-layer forming fabric that addresses the problem of interlayer wear.

These and other objects are satisfied by the present invention, which relates to a multi-layer papermaker's forming fabric with stitching yarns integrated into the papermaking surface. The fabric is formed as a plurality of repeating units. Each of the repeating units comprises: a set of top machine direction yarns; a set of top cross-machine direction yarns interwoven with the set of top machine direction yarns; a set of bottom machine direction yarns; a set of bottom cross-machine direction yarns interwoven with the set of bottom machine direction yarns; and pairs of first and second stitching yarns. The stitching yarn pairs are positioned between pairs of top cross-machine direction yarns. The stitching yarns of each pair are interwoven with the top and bottom machine direction yarns such that, as a fiber support portion of the first stitching yarn is interweaving with the top machine direction yarns, a binding portion of the second stitching yarn is positioned below the top machine direction yarns, and such that as a fiber support portion of the second stitching yarn is interweaving with the top machine direction yarns, a binding portion of the first stitching yarn is positioned below the top machine direction yarns. The first and second stitching yarns cross each other as they pass below a transitional top machine direction yarn. Also, each of the binding portions of the first and second stitching yarns passes below at least one of the bottom machine direction yarns. In this configuration, the stitching yarns are completely integrated into the top, or papermaking, surface of the fabric, and therefore do not adversely impact the papermaking qualities of the fabric. Also, the relatively large number of stitching yarns provides reliable binding of the top and bottom layers of the fabric.

In two illustrated embodiments of the fabric, the stitching yarns are interwoven with the top MD and CMD yarns so that they form a plain weave papermaking surface. In this embodiment, it is preferred that the stitching yarns be interwoven as "reverse picks" (this term is defined in detail hereinbelow). In another illustrated embodiment, the stitching yarns are interwoven with the top MD and CMD yarns to form a 1×2 twill top surface. In these embalmments, the integration of the stitching yarns into the papermaking surface of the fabric addresses many of the problems associated with prior art triple layer fabrics, such as distortion of the papermaking surface and inadequate binding of the top and bottom layers.

DETAILED DESCRIPTION OF THE PREFERRED EMBODIMENTS

The present invention will be described more particularly hereinafter with reference to the accompanying drawings. The invention is not intended to be to the illustrated embodiments; rather, these embodiments are intended to fully and completely disclose the invention to those skilled in this art.

Figure 1B:
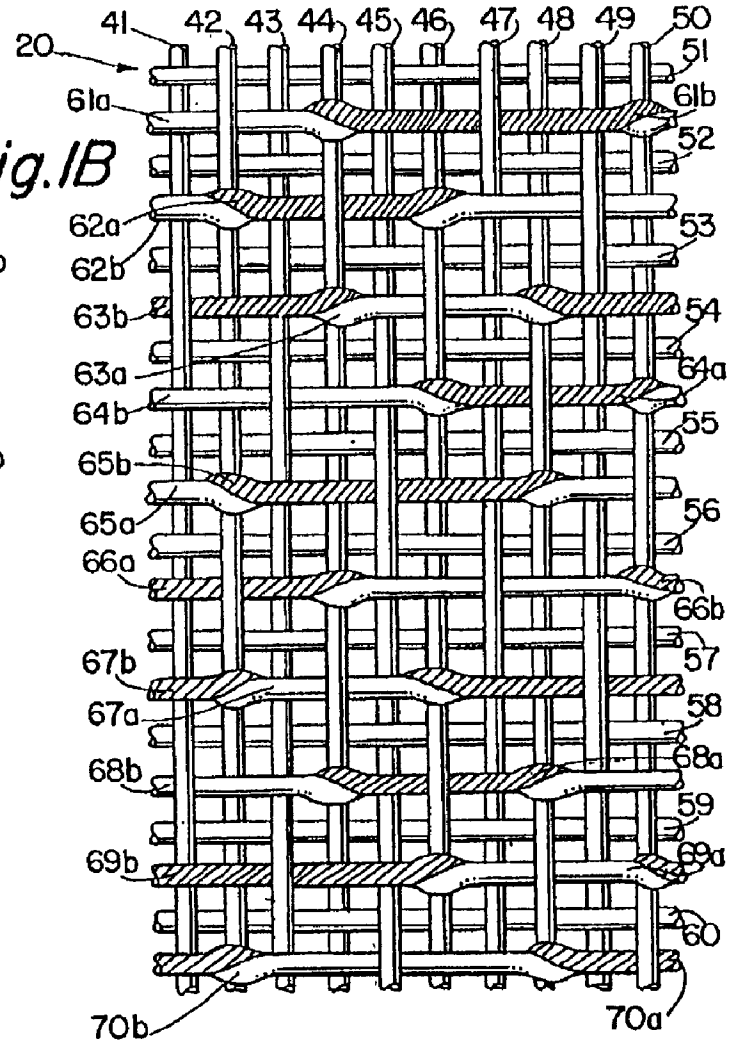
FIG. 1B is a plan view of the bottom layer of the fabric of FIG. 1.
Figure 1A:
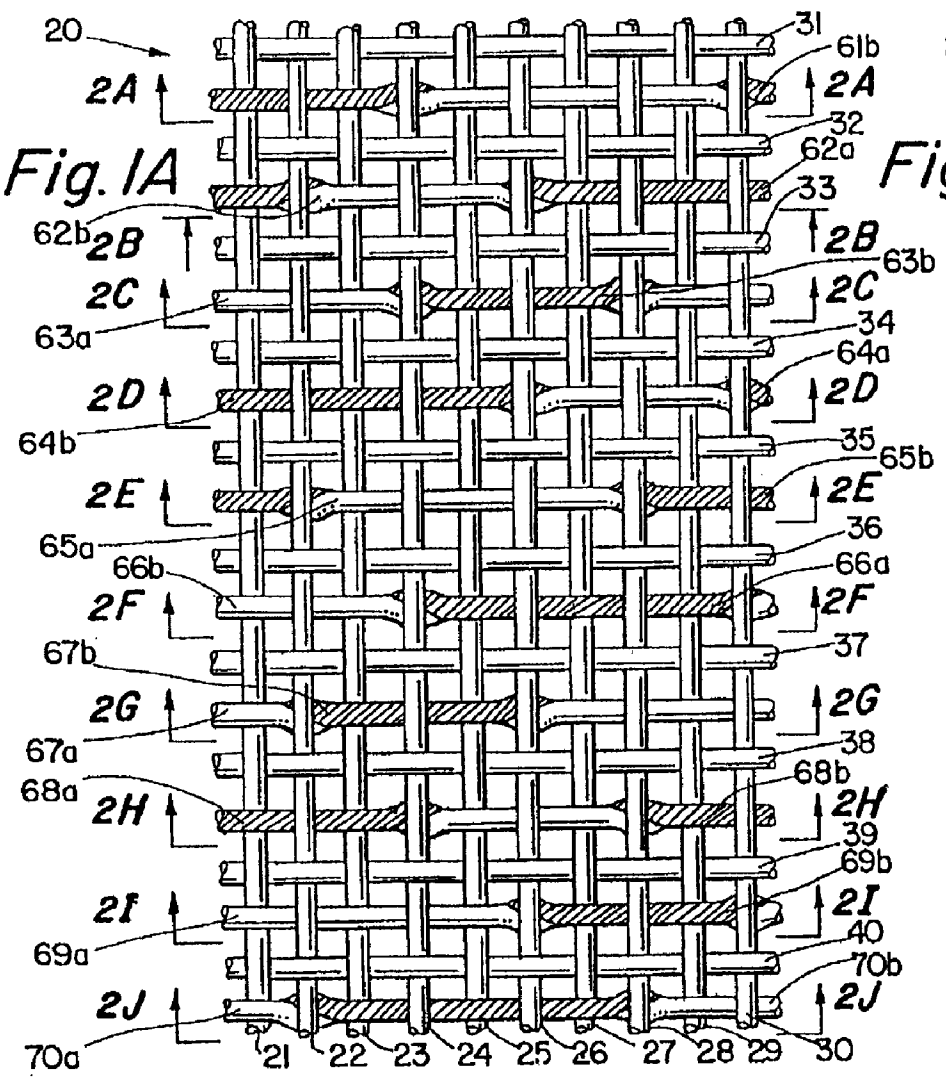
FIG. 1A is a top view of an embodiment of a 20 harness multi-layer forming fabric of the present invention having a plain weave top surface.

A 20 harness multi-layer forming fabric, generally designated at 20, is illustrated in FIGS. 1A and 1B, in which a single repeat unit of the fabric is shown. As seen in FIG. 1A, the repeat unit of the fabric 20 includes a top layer having ten top MD yarns 21-30 and ten top CMD yarns 31-40. These are interwoven such that each top CMD yarn passes over and beneath top MD yarns in an alternating fashion, with each top CMD yarn passing over and under the same top MD yarns. For example, top CMD yarn 31 passes under top MD yarn 21, over top MD yarn 22, under top MD yarn 23, over top MD yarn 24 and so on until it passes over top MD yarn 30. Similarly, top CMD yarn 32 passes under top MD yarn 21, over top MD yarn 22, under top MD yarn 23, over top MD yarn 24 and so on until it passes over top MD yarn 30.

Referring now to FIG. 1B, a repeat unit of the bottom layer of the fabric is shown. The repeat unit includes ten bottom MD yarns 41-50 which are interwoven with ten bottom CMD yarns 51-60. The bottom MD yarns 41-50 are interwoven with the bottom CMD yarns 51-60 in a 1-4 twill type pattern, with each bottom CMD yarn passing above one bottom MD yarn, below four bottom MD yarns, above one bottom MD yarn, and below four bottom MD yarns. For example, bottom CMD yarn 51 passes above bottom MD yarn 41, below bottom MD yarns 42-45, above bottom MD yarn 46, and below bottom MD yarns 47 through 50. The other bottom CMD yarns follow a similar "over 1/under 4" weave pattern, but each is offset from its nearest bottom CMD yarn neighbors by two bottom MD yarns. Consequently, bottom CMD yarn 52 passes below bottom MD yarns 41 and 42, above bottom MD yarn 43, below bottom MD yarn 44 through 47, above bottom MD yarn 48, and below bottom MD yarns 49 and 50. Thus the "knuckle" formed by bottom MD yarn 43 as it passes below bottom CMD yarn 52 is offset from the "knuckle" formed by bottom MD yarn 41 as it passes over bottom CMD yarn 51 by two bottom MD yarns.

The top layer (formed by the top MD yarns and the top CMD yarns) and the bottom layer (formed by the bottom MD yarns and the bottom CMD yarns) are stitched together with twenty stitching yarns, designated herein as pairs 61a, 61b through 70a, 70b. The stitching yarns are positioned in pairs between adjacent CMD yarns. For example, stitching yarns 61a and 61b are positioned between top CMD yarns 31 and 32 and between bottom CMD yarns 51 and 52. The stitching yarns interweave with the top MD yarns and bottom MD yarns to bind the top and bottom fabric layers together.

As can be seen in FIGS. 2A through 2J, corresponding pairs of stitching yarns interweave with the top MD yarns and bottom MD yarns in the following pattern. Each of the stitching yarns of the repeat unit can be subdivided into two portions: a fiber support portion which interweaves with the top MD yarns, and a binding portion which interweaves with a bottom MD yarn. These are separated at "transitional" top MD yarns, below which one stitching yarn of a pair crosses the other stitching yarn of the pair. The stitching yarns of each pair are interwoven relative to one another such that the fiber support portion of one yarn of the pair is positioned above the binding portion of the other yarn of the pair. The fiber support portion of the stitching yarn of each pair designated with an "a" (e.g., 61a, 62a, 63a) interweaves in an alternating fashion with five top MD yarns (alternately passing over three top MD yarns and under two top MD yarns), and the other stitching yarn of the pair (those designated with a "b") passes over two top MD yarns while passing below a top MD yarn positioned between those two MD yarns. In its fiber support portion, each stitching yarn passes over top MD yarns that the top CMD yarns pass beneath, and passes below top MD yarns that each top CMD yarn passes over. In this manner, the stitching yarns and top CMD form a plain weave pattern with the top MD yarns (see FIG. 1A). In its binding portion, each stitching yarn passes below one bottom MD yarn in the repeat unit such that an "over4/under1" pattern is established by the pair of stitching yarns on the bottom surface of the fabric 20 (see FIG. 1B).

Figures 2A, 2B, 2C, 2D, 2E, 2F, 2G, 2H, 2I, 2J:
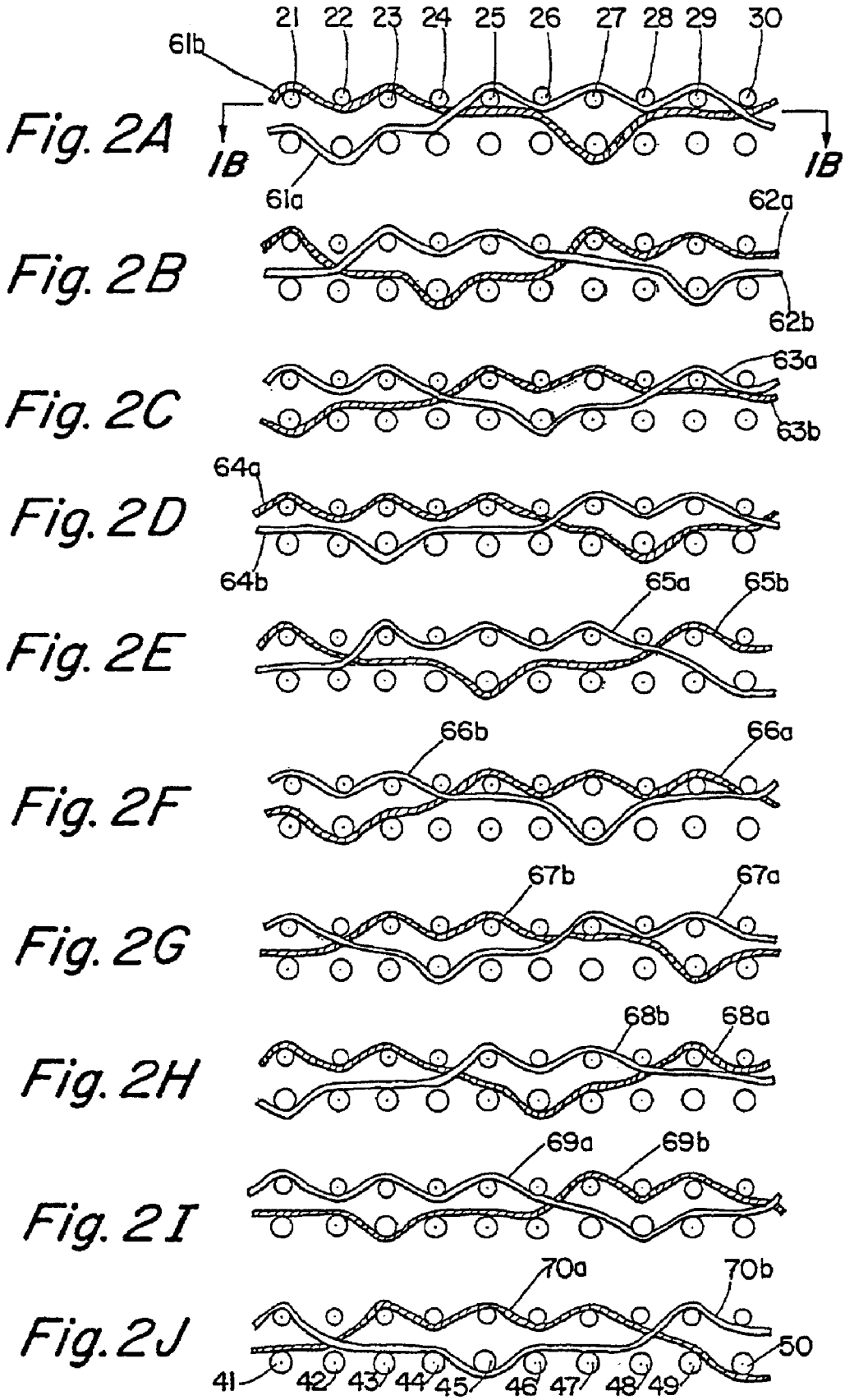
FIGS. 2A through 2J are section views of the stitching yarns of the fabric of FIGS. 1A and 1B.

The weaving pattern of the stitching yarns is exemplified in FIG. 2D, which illustrates stitching yarns 64a, 64b interweaving with top and bottom MD yarns. In its fiber support portion, stitching yarn 64a passes over top MD yarns 21, 23 and 25, and below top MD yarns 22 and 24. It then passes below transitional top MD yarn 26 and above bottom MD yarn 46. In its biding portion, stitching yarn 64a passes below top MD yarns 27 through 29 while passing above bottom MD yarns 47 and 49 and below bottom MD yarn 48 to stitch the bottom layer of the fabric 20. Stitching yarn 64a then passes between top transitional MD yarn 30 and bottom MD yarn 50. FIG. 2D also illustrated that stitching yarn 64b is interwoven such that its binding portion is below that of stitching yarn 64a; stitching yarn 64b passes below top MD yarns 21 through 25 while passing above bottom MD yarns 41, 42, 44, 45 and below bottom MD yarn 43. In its fiber support portion, stitching yarn 64b passes above top MD yarn 27, below top MD yarn 28 and above top MD yarn 29. As a result, the fiber support portions of stitching yarns 64a, 64b combine a form the "over 1/under 1" pattern of a plain weave on the top layer, and the binding portions of stitching yarns 64a, 64b combine to form the "over 4/under 1" pattern described above.

As can be seen in FIGS. 2A through 2C and FIGS. 2E through 2J (which depict the interweaving patterns of the other stitching yarn pairs with the top and bottom MD yarns), the same pattern described hereinabove for the stitching yarns 64a, 64b relative to each other is followed by the other stitching yarn pairs.

Referring back to FIGS. 1A and 1B, pairs of stitching yarns that are positioned adjacent to and on opposite sides of a top or bottom CMD yarn are interwoven with the top or bottom MD yarns such that there is an offset of two MD yarns between such stitching yarn pairs. For example, stitching yarn 61a passes above top MD yarns 25, 27 and 29 and below bottom MD yarn 42. Stitching yarn 62a passes above top MD yarns 27, 29 and 21 (with top MD yarn 21 being a continuation of the pattern on the opposite side) and below bottom MD yarn 44. Thus, stitching yarn 61a is offset from stitching yarn 62a by two top and bottom MD yarns. This same two MD yarn offset is followed for the interweaving of the other stitching yarns.

It can also be seen in FIGS. 1A and 1B that the stitching yarns are interwoven with the top and bottom MD yarns as "reversed picks." This term can be understood by examination of stitching yarn pairs 61a, 61b, 62a, 62b, 63a, 63b. As shown in FIGS. 1A and 2A, stitching yarn 61a is positioned nearer to top CMD yarn 32 than is stitching yarn 61b. As seen in FIGS. 1A and 2B, on the other side of the top CMD yarn 32, stitching yarn 62a is positioned nearer to top CMD yarn 32 than is stitching yarn 62b. As a result, the fiber support portions of stitching yarns 61a, 62a are positioned nearer to top CMD yarn 32 than are the fiber support portions of stitching yarns 61b, 62b. This relative proximity to the top CMD yarn between adjacent pairs of stitching yarns is reversed with stitching yarn pairs 62a, 62b and 63a, 63b. As seen in FIGS. 1A, 2B, and 2C, stitching yarns 62b and 63b are positioned nearer top CMD yarn 33 than stitching yarns 62a, 63a, with the result again that the fiber support portions of the nearer stitching yarns are also positioned nearer to top CMD yarn 33.

It has been discovered that this "reversed picks" configuration is particularly effective in masking the presence of stitching yarns in the top surface of the fabric. When a transitional yarn passes over the stitching yarns of a pair to form a top surface knuckle, that knuckle tends to receive less upwardly-directed support from the stitching yarns at that location than other locations on the top MD yarn where it passes over a stitching yarn or top CMD yarn. As a result, that knuckle tends to be positioned slightly lower than the other top MD knuckles. As seen in FIG. 1A, the top MD knuckles of transitional yarn form a diagonal line; because the knuckles of this diagonal may all be positioned somewhat lower than the remaining top MD knuckles, paper formed on such a fabric can show this pattern, which can in turn affect images printed thereon. By including the stitching yarns as reversed picks, such as is illustrated in fabric 20, however, the diagonal formed by the traditional top MD knuckles is disturbed somewhat and is less distinctly defined. As such, paper formed on fabric 20 has a less distinct diagonal pattern due to these knuckles, and printing on the paper is improved.

Those skilled in this art will appreciate that the aforedescribed "reverse picks" configuration is created in the fabric by weaving the stitching yarns into the top and bottom MD yarns so that first an "a" stitching yarn immediately follows the waving of top and bottom CMD yarns (followed by a "b" stitching yarn), then a "b" stitching yarn immediately follows the next set of top and bottom CMD yarns (followed by an "a" stitching yarn). This pattern can be repeated throughout weaving. Although it is preferred that all of the stitching yarn pairs follow this pattern (i.e., that 50 percent of the stitching yarn pairs be "reversed"), some benefit can be obtained by reversing only a smaller percentage (for example 25, 33, or 40 percent) of the stitching yarn pairs.

Another embodiment of the present invention is illustrated in FIGS. 3A, 3B and 4A through 4L, wherein a repeat unit of a 24 harness multi-layer forming fabric designated broadly at 100 is shown. The fabric 100 comprises top machine direction yarns 101 through 112, top CMD yarns 121 through 132, bottom MD yarns 141 through 152, bottom CMD yarns 161 through 172, and stitching yarns 181a, 181b through 192a, 192b. One pair of stitching yarns is positioned between each pair of top CMD yarns and each pair of bottom CMD yarns.

Figures 3A, 3B:
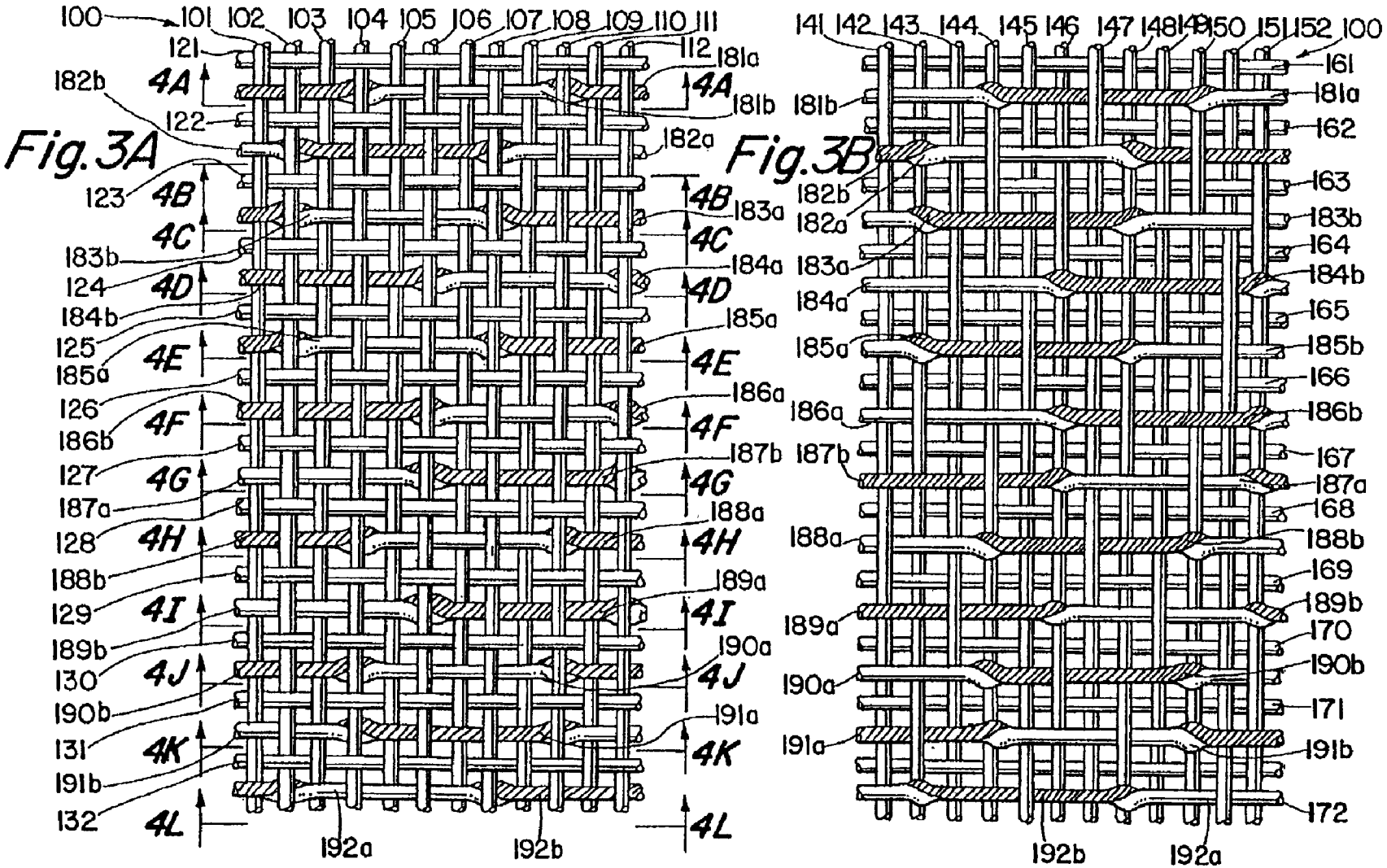
FIG. 3A is a top view of an embodiment of a 24 harness multi-layer forming fabric of the present invention having a plain weave top surface.
FIG. 3B is a plan view of the bottom layer of the fabric of FIG. 3A.
Figures 4A, 4B, 4C, 4D, 4E, 4F, 4G, 4H, 4I, 4J, 4K, 4L:
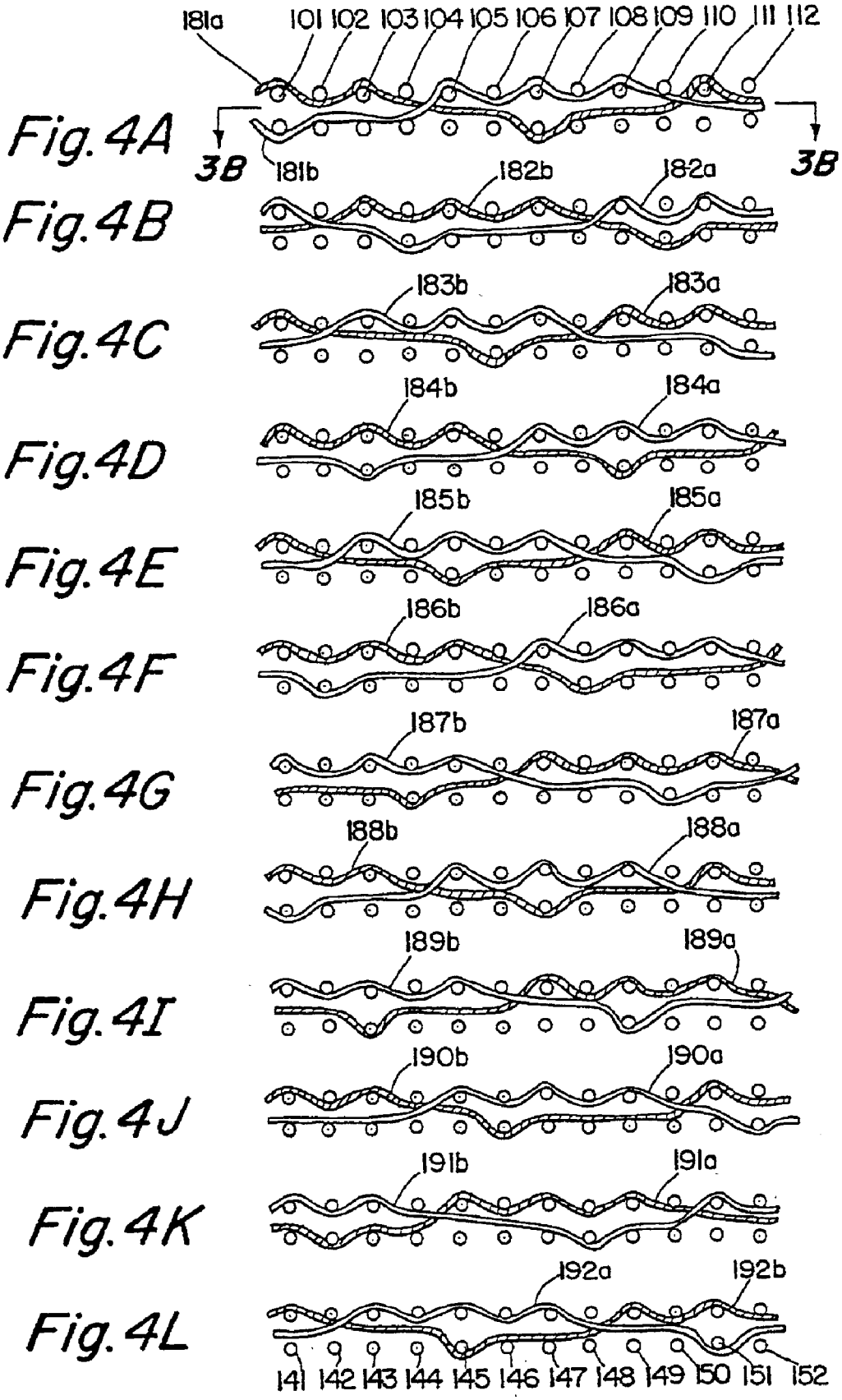
FIGS. 4A through 4L are section views of the stitching yarns of the fabric of FIGS. 3A and 3B.

Like the fabric 20, the top MD and CMD yarns of the fabric 100 are interwoven such that each top CMD yarn passes over and under alternate MD yarns, and so that every CMD yarn passes over and under to same MD yarns. These, in combination with the stitching yarn pairs, form a top papermaking surface that has a plain weave pattern (FIG. 3A). The bottom MD and CMD yarns are interwoven so that each bottom CMD yarn follows an "over 1/under 5" pattern relative to the bottom MD yarns, and so that the knuckles formed by the bottom MD yarns take a "broken twill" pattern, in which the knuckles formed under adjacent CMD yarns are first offset by two MD yarns in one direction, then by three MD yarns in the opposite direction. Thus, the knuckles form a zig-zag diagonal pattern (see FIG. 3B).

Each of the stitching yarns of the fabric 100 has a fiber support portion, which interweaves with the top MD yarns, and a binding portion, which stitches the bottom layer of the fabric. As in the fabric 20, these portions of the stitching yarns are separated at transitional top MD yarns, under which both stitching yarns of a pair pass under and cross. The fiber support portion of each stitching yarn is positioned above the binding portion of the other stitching yarn of its pair.

Each of the stitching yarns of the fabric 100 follows the same weave pattern in its fiber support portion as it interweaves with the top MD yarns, with each stitching yarn passing over three top MD yarns and under two top MD yarns in an alternating fashion. The stitching yarns pass over the top MD yarns passed under by the top CMD yarns, then pass over the top MD yarns passed under by the top CMD yarns, with the result that the top layer of the fabric 100 has a plain weave surface. Pairs of stitching yarns are interwoven with the top MD yarns such that each group of four adjacent stitching yarn pairs falls within a pattern in which the fiber support portions of three of the four pairs of stitching yarns are not offset from one another in the MD direction at all; i.e., the fiber support portions of each pass over the same top MD yarns. The fiber support portion of fourth pair of stitching yarns of the group is offset from the others within the group by two top MD yarns. For the fiber support portions of the next group of four yarn pairs, the entire group is offset by two top MD yarns in the direction opposite of the offset of the individual stitching yarn pair.

As an example of this pattern, the stitching yarns 188a, 189a, 190a, and 191a form a group of four stitching yarns in adjacent stitching yarn pairs. Of these, stitching yarns 188a, 190a, and 191a pass over top MD yarns 105, 107, and 109. Stitching yarn 189a passes over top MD yarns 107, 109, and 111, which represents a two MD yarn offset. The next group of four stitching yarn pairs would then begin with stitching yarn 191a, which passes over top MD yarns 103, 105 and 107; this represents a two top MD yarn offset in the direction opposite that of the offset of stitching yarn 189a. This pattern continues for each group of four stitching yarn pairs.

In its binding portion, each stitching yarn passes below five top MD yarns and above four bottom MD yarns while passing below one bottom MD yarn to stitch the top and bottom layers together. The bottom MD yarn stitched by the stitching yarn binding portion follows one of three different patterns; it is either the second, third or fourth bottom MD yarn reached by the stitching yarn after passing below a traditional top MD yarn. For example, stitching yarn 182a passes below bottom MD yarn 144, the second bottom MD yarn it approaches after passing below transitional top MD yarn 102. In contrast, stitching yarn 181a passes below bottom MD yarn 147, the third bottom MD yarn it approaches after passing below traditional top yarn 104, and stitching yarn 183a passes below bottom MD yarn 146, the fourth bottom MD yarn it approaches after passing below transitional top MD yarn 102.

Notably, the stitching yarns of each pair follow the same weave pattern in their binding portions as the other stitching yarn of that pair (i.e., like stitching yarn 183a, stitching yarn 183b also stitches the fourth bottom MD yarn it approaches after passing below a transitional top MD yarn). Also, it can be seen from FIGS. 4A through 4L that the stitching yarn pairs follow a pattern in which the stitching yarns of the first pair stitch the third bottom MD yarn they approach, the stitching yarns of the second pair stitch the second bottom MD yarn they approach, the stitching yarns of the third pair stitch the fourth bottom MD yarn they approach, and the stitching yarn of the fourth pair stitch the third bottom MD yarn they approach. This "third/second/fourth/third" pattern is repeated three times within the repeat unit.

Like the stitching yarns of the fabric 20, the stitching yarns of the fabric 100 are also interwoven as "reverse picks." The "reveres picks" nature of the fabric can be see in FIG. 3B, where a zig-zagging line indicates the broken twill pattern of knuckles formed on the bottom layer by the bottom MD yarns and the stitching yarns. This line indicates locations where a bottom side knuckle formed by a bottom MD yarn is sandwiched between two stitching yarn knuckles, each of which is offset from the bottom MD knuckle by one bottom MD yarn. Following this pattern, it can be seen that stitching yarns of adjacent pairs within the pattern are both nearer to the bottom CMD yarn they flank than are their paired stitching yarns. For those stitching yarn knuckles on the diagonal line between which there is no bottom MD knuckle, their stitching yarns are farther from the bottom CMD yarn they flank than are their paired stitching yarns. Thus, the reversing of the stitching yarns in this embodiment can be identified by the weave pattern in the bottom layer of the fabric 100. As with the fabric 20, reversing of the stitching yarns in the fabric 100 disturbs any pattern formed by top transitional MD yarn knuckles and, therefore, provides a fabric that produces a higher quality paper for printing.

Those skilled in the art will also appreciate that other plain weave patterns in which the stitching yarns are divided differently into fiber support portions and binding portions can be constructed. For example, the fabric can include a top layer in which each stitching yarn of a pair passes over two or four top MD yarns in its fiber support portion. As illustrated, the stitching yarns can pass over different numbers of top MD yarns, or can pass over the same number. Of course, appropriate adjustment of the positioning of the bottom knuckles in the binding portions of such stitching yarns should be made with changes to the stitching yarn pattern on the top surface.

Another embodiment of a multi-layer forming fabric of the present invention is illustrated in FIGS. 5A, 5B and 6A through 6F, in which a repeat unit of a broken twill multi-layer forming fabric, designated broadly at 200, is illustrated. The repeat unit includes 12 top MD yarns 201 through 212, 6 top CMD yarns 221 through 226, 12 bottom MD yarns 241 through 252, 6 bottom CMD yarns 261 through 266, and 12 stitching yarns 281a, 281b through 286a, 286b.

Figure 5B:
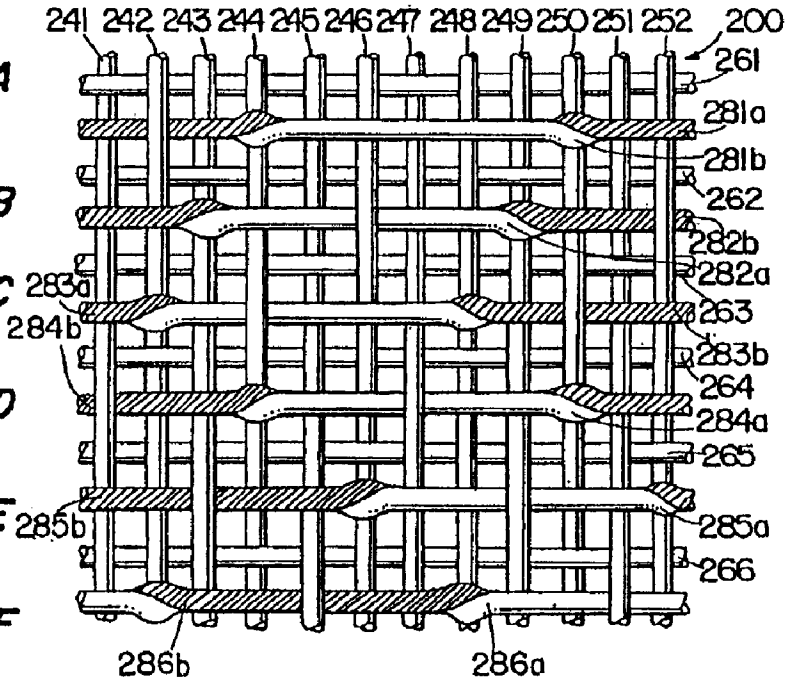
FIG. 5B is a plan view of the bottom layer of the fabric of FIG. 5A.
Figure 5A:
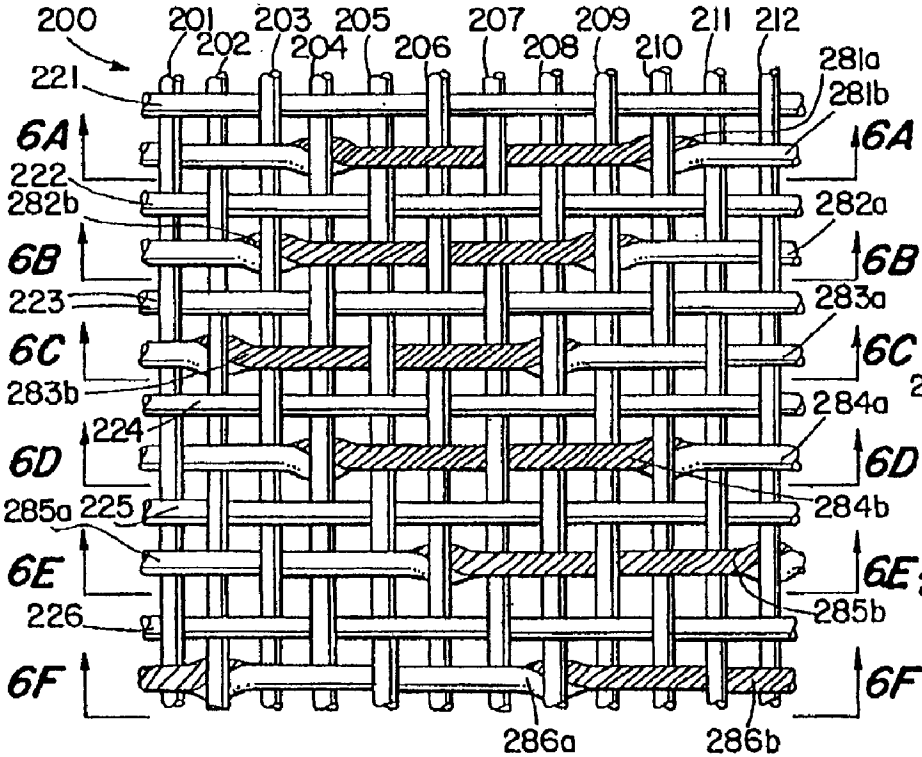
FIG. 5A is a top view of a 24 harness multi-layer forming fabric of the present invention having a 1×2 twill top surface.

As shown in FIG. 5A, the top surface of the fabric 200 has a 1×2 twill pattern formed by the top MD yarns, the top CMD yarns and the fiber support portions of the stitching yarns. More specifically, each top CMD yarn interweaves with the top MD yarns in an "over 2/under 1" pattern; this is demonstrated by top CMD yarn 221, which passes over top MD yarns 201 and 202, under top MD yarn 203, over top MD yarns 204, 205, under top MD yarn 206, over top MD yarns 207, 208, under top MD yarn 209, over top MD yarns 210, 211, and under top MD yarn 212. The remaining top CMD yarns follow the same "over 2/under1" pattern, but are laterally offset from their adjacent CMD yarns by two MD yarns. For example, top CMD yarn 222 passes over top MD yarn 201, under top MD yarn 202, over top MD yarn 203 and 204, and under top MD yarn 205 before continuing in an over 2/under 1 pattern. Thus, the "over 2" portion of top CMD yarn 222 is first seen as it passes over top MD yarns 203 and 204, which are offset from the top MD yarns 201, 202 passed over by top CMD yarn 221 by two MD yarns.

Referring now to FIG. 5B, the machine side surface of the fabric 200 formed by the bottom MD and cross MD yarns takes the pattern of a "broken twill." Each bottom CMD yarn has an "under 5/over 1" repeat pattern with the bottom MD yarns. For example, bottom CMD yarn 261 passes over bottom MD yarn 241, under bottom MD yarns 242 through 246, over bottom MD yarn 247, and under bottom MD yarns 248 through 252. This "under 5/over 1" pattern is repeated by the remaining CMD yarns. However, the bottom side knuckles formed by the bottom MD yarns as they pass below the bottom CMD yarns are arranged in a broken twill pattern, with the bottom side knuckles being formed by bottom MD yarns 241, 243, 245, 242, 246, 244 on bottom CMD yarns 261 through 266, respectively, and by bottom yarns 247, 249, 251, 248, 252, and 250 on bottom CMD yarns 261 through 266 respectively. As can be seen in FIG. 5B, these knuckles fail to form a clear diagonal as is characteristic of twill fabrics, but instead form a "broken twill" pattern.

The top and bottom layers of the fabric 200 are bound together by the stitching yarns listed above, each of which has both a fiber support portion and a binding portion. As with the fabrics 20 and 100 described earlier, the fiber support portion and binding portion of each stitching yarn are divided by traditional top MD yarns below which stitching yarns of a pair cross each other. The fiber support portion of each stitching yarn follows an "over 2/under 1/over 2" pattern. In its binding portions, each stitching yarn passes between the top and bottom MD yarns with the exception of passing below one bottom MD yarn to stitch the top and bottom layers together. The bottom MD yarn that is stitched is located either two or three MD yarns away from the transitional MD yarns that separate the fiber support and binding portions of each stitching yarn.

Figure 6A:
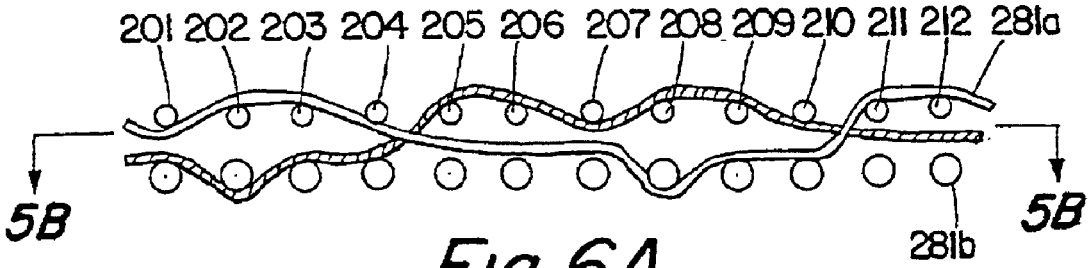
FIGS. 6A through 6F are section views of the stitching yarns of the fabric of FIGS. 5A and 5B.
Figure 6B:
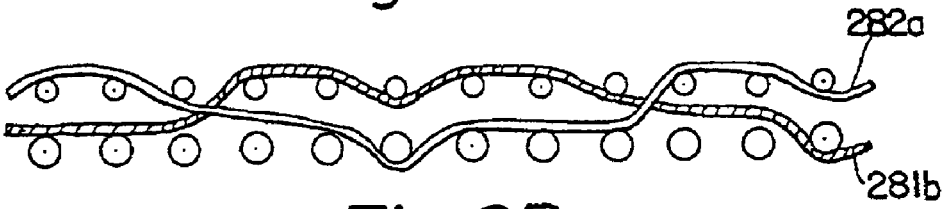
Figure 6C:
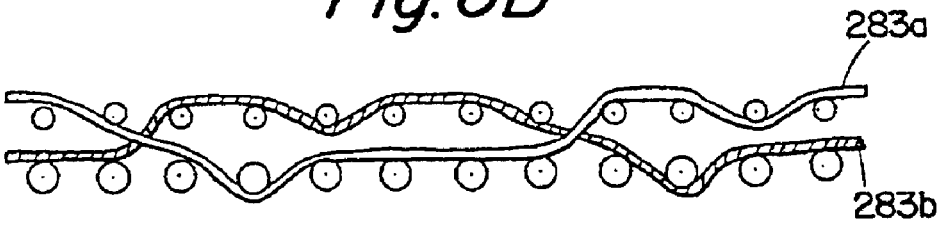
Figure 6D:
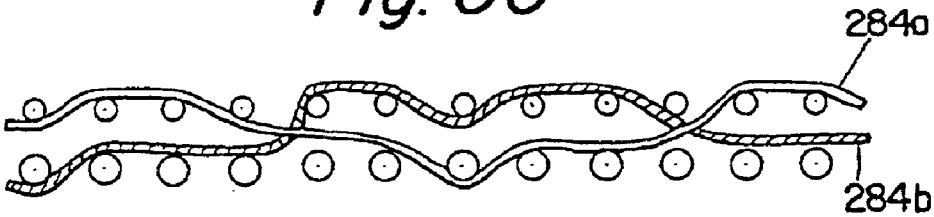
Figure 6E:
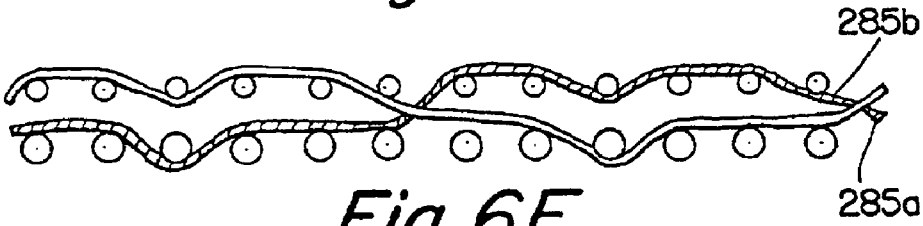
Figure 6F:
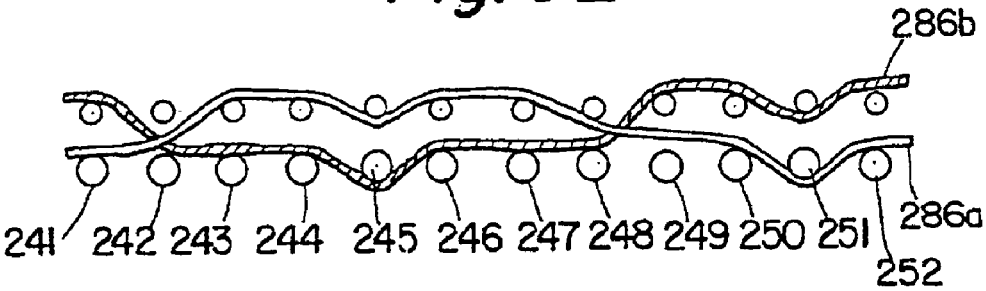

This pattern is exemplified by stitching yarn 285a, the stitching pattern of which is illustrated in FIG. 6E. Stitching yarn 285a passes over top MD yarns 201 and 202, under top MD yarn 203, and over top MD yarns 204, 205 before passing below transitional top MD yarn 206. In its binding portion, stitching yarn 285a passes above bottom MD yarns 247 and 248, below bottom MD yarn 249 and above bottom MD yarns 250, 251 before passing below transitional top MD yarn 212 and above bottom MD yarn 252.

Pairs of stitching yarns are interwoven with the top MD yarns relative to one another such that their fiber support portions, the top MD yarns, and the top CMD yarns form a 1×2 twill pattern. Referring again to FIG. 6E, and as described above, stitching yarn 285a passes above top MD yarns 201, 202 under top MD yarn 203, and over top MD yarns 204, 205. Both stitching yarns 285a, 285b pass below transitional top MD yarn 206, after which the fiber support portion of stitching yarn 285b continues the over 2/under 1 twill pattern first established by stitching yarn 285a. In doing so, stitching yarn 285b passes above top MD yarns 207, 208, below top MD yarn 209 and above top MD yarns 210, 211 before passing below transitional top MD yarn 212.

FIG. 5A demonstrates that the stitching yarns are interwoven with the top and bottom MD yarns relative to top CMD yarns such that an "over 2" segment of each fiber support portion is offset by one MD yarn from an "over 2" segment of the top CMD yarns that flank that stitching yarn. For example, the stitching yarn 281a passes over top MD yarns 202 and 203. The nearest top CMD yarns, which are 221 and 222, pass over top MD yarns 201, 202 and 203, 204 respectively. Thus, the distinctive diagonal of a twill is formed by the top CMD yarns and the fiber support portions of the stitching yarns.

FIG. 5B also illustrates how the stitching yarns are stitched into the bottom MD yarns. It can be seen in FIG. 5B that the knuckle formed by each stitching yarn as it passes below a bottom MD yarn is positioned such that, in one direction, two bottom CMD yarns reside between the stitching yarn knuckle and the knuckle formed by that bottom MD yarn over a bottom CMD yarn, and in the opposite direction, three bottom CMD yarns reside between the stitching yarn knuckle and the next knuckles formed by that bottom MD yarn over a CMD yarn. For example, stitching yarn 284a forms a knuckle as it passes under bottom MD yarn 241. The bottom MD yarn 241 forms a knuckle as it passes under bottom CMD yarn 261, which is separated from the knuckle formed by stitching yarn 284a by three bottom CMD yarns (262, 263, 264). Continuing with the pattern in the other direction, bottom CMD yarns 265 and 266 are positioned between the knuckle formed by stitching yarn 284a and the knuckle that would be formed by bottom MD yarn 241 under the next bottom CMD yarn after bottom CMD yarn 266 (which would have the same weave pattern as bottom CMD yarn 261). Thus, the stitching yarn knuckle of stitching yarn 284a is separated from bottom MD yarn knuckles by three bottom CMD yarns in one direction and by two CMD yarns in the other direction.

Those skilled in this art will appreciate that fabrics of the present invention can be construed with other twill patterns in the top layer. For example, a fabric can have a 1×3 or 1×4 twill top layer. Any of these twill patterns can be a conventional twill, such as that of the fabric 100, or can take a broken twill pattern, such as those embodied in 4 or 5 harness satin single layer fabrics. Fabrics can also be constructed in which fiber support portions of stitching yarn pairs pass over different numbers of top MD yarns. In each instance, the skilled artisan should understand the appropriate modifications to the binding portions of the stitching yarns to accommodate differences in the fiber support portions.

Those skilled in this art will recognize that, although the plain weave and twill fabrics illustrated and described in detail herein are preferred, other fabric weaves, such as other twill weaves and satins, that employ pairs of stitching yarns integrated into the papermaking surface of a fabric with the top CMD yarns can also be made. Also, any number of configuration of the bottom layer in which stitching yarn pairs stitch the bottom MD yarns can be used. It is also contemplated that, rather than including a pair of stitching yarns between each pair of top CMD yarns, a fabric in which a pair of stitching yarns is included between every other pair of top CMD yarns can be constructed. In addition, although the illustrated fabrics have equal numbers of top and bottom MD and CMD yarns, this need not be the case for the present invention; other ratios, such as two top CMD yarns for each bottom CMD yarn, can also be employed.

The configurations of the individual yarns utilized in the fabrics of the present invention can vary, depending upon the desired properties of the final papermakers' fabric. For example, the yarns may be multifilament yarns, monofilament yarns, twisted multifilament or monofilament yarns, spun yarns, or any combination thereof Also, the materials comprising yarns employed in the fabric of the present invention may be those commonly used in papermakers' fabric. For example, the yarns may be formed of cotton, wool, polypropylene, polyester, aramid, nylon, or the like. The skilled artisan should select a yarn material according to the particular application of the final fabric.

Regarding yarn dimensions, the particular size of the yarns is typically governed by the size and spacing of the papermaking surface. Generally, the diameter of the top CMD yarns is about 25 to 75 percent of the diameter of the bottom CMD yarns, and the diameter of the top MD yarns is about equal to or smaller than the diameter of the top CMD yarns. In a typical fabric, the diameter of the top CMD yarns is between about 0.11 and 0.17 mm, the diameter of the top MD yarns is between about 0.11 and 0.15 mm, the diameter of the bottom CMD yarns is between about 0.20 and 0.40 mm, and the diameter of the bottom MD yarns is between about 0.17 and 0.25 mm. The diameter of the stitching yarns is typically between about 0.11 and 0.17 mm.

Yarns may also vary advantageously in modulus of elasticity. For example, stitching yarns that interweave with a fewer number of top MD yarns than its paired stitching yarn (such as the "b" yarns of fabric 20) may have a higher modulus of elasticity (typically between about 10 and 50 percent higher) than its paired stitching yarn.

As the foregoing discussion demonstrates, the fabrics of the present invention address problems encountered with prior art triple layer forming fabrics. The fabrics of the present invention integrate the stitching yarns into the top surface of the fabric, whether it be a plain weave, a twill, a satin, or other pattern, and therefore avoid the marring of the papermaking surface that can accompany stitching yarns that comprise less of the papermaking surface. The integration of the fabric attributable to the stitching yarns also greatly reduces (if not eliminating) interlayer wear. In addition, because the stitching yarns comprise such a large portion of the papermaking surface, the differences in tension between the top CMD yarns and the stitching yarns that can distort the papermaking surfaces of other fabric are less critical to the fabrics of the present invention. The destiny of the stitching yarns also provides a tighter and more reliable binding of the top and bottom layers of the fabric, which can provide the designer with a wider variety of yarn choices to balance paper forming properties, durability and wear.

The foregoing embodiments are illustrative of the present invention, and are not to be construed as limiting thereof. The invention is defined by the following claims, with equivalents of the claims to be included therein.

That which is claimed:

1. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding potion of said first stitching vam is positioned below said top machine direction yarns, and such that said first and second stitching yarns cross each other as they pass below a transitional top machine direction yarn, and such that each of said binding portions of said first and second stitching yarns passes below at least one of said bottom machine direction yarns;

wherein each of said top cross machine direction yarns passes over a first group of alternate top machine direction yarns and under a second group of alternate top machine direction yarns, with each of said yarns of said first group being positioned between a pair of yarns of said second group, and with each of said yarns of said second group being positioned between a pair of yarns of said first group, and wherein said fiber support portions of said first and second stitching yarns pass under said first set of alternate top machine direction yarns and over said second set of alternate top machine direction yarns, such that said top machine direction yarns, said top cross machine direction yarns, and said fiber support portions of said first and second stitching yarn form a plain weave pattern;

wherein said fiber support portions of said first stitching yarns pass over a first number of said machine direction yarns, said fiber support portions of said second stitching yarns pass over a second number of said machine direction yarns, and said first number differs from said second number.

2. The papermaker'a fabric defined in claim 1, wherein said first number is larger than said second number, and wherein said second stitching yarn has a higher modulus of elasticity than said first stitching yarn.

3. The papermaker's fabric defined in claim 1, wherein said first number is three, and second number is two.

4. The papermaker's fabric defined in claim 1, wherein said first and second stitching yarns are of a smaller diameter than said top machine direction yarns.

5. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, an such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portion of said first and second stitching yarns passes beneath only one of said bottom machine direction yarns.

6. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns, wherein said repeat unit includes 10 top machine direction yarns and 10 bottom machine direction yarns.

7. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top machine direction yarns interwoven with said set of top machine direction yarns;

a set of bottom machine direction yarns;

a set of bottom cross machine direction yarns interwoven with said set of bottom machine direction yarns;

wherein a pair of first and second stitching yarn is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns;

wherein said top machine direction yarns and said top cross machine direction yarns are interwoven in a repeating pattern such that each of said top cross machine direction yarns passes over a first pair of adjacent top machine direction yarns, under a third top machine direction yarn adjacent to said first pair, and over a second pair of top machine direction yarns positioned adjacent said third top machine direction yarn, and wherein adjacent top cross machine direction yarns pass over top machine direction yarn pairs that are offset by two top machine direction yarns;

wherein said stitching yarns are interwoven with said top machine direction yarns in a repeating pattern such that said fiber support portion of each of said first and second stitching yarns passes over a third pair of adjacent top machine direction yarns, under an adjacent top machine direction yarn, and over a fourth pair of adjacent machine direction yarns, then passes under said transitional top machine direction yarn, said third and fourth pairs of top machine direction yarns being offset from said first and second pairs by one machine direction yarn, such that said top machine direction yarns, said cross machine direction yarns, and said fiber support portions of said first and second stitching yarns form a 1×2 twill pattern.

8. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a traditional top machine direction yarn, and such that each of said binding portions of said first and second stitching yarns passes below at least one of said bottom machine direction yarns;

wherein said stitching yarns are interwoven with said top and bottom machine direction yarns such that adjacent pairs of stitching yarns cross beneath traditional top machine direction yarns that are offset by two top machine direction yarns.

9. The papermaker's fabric defined in claim 8, wherein between 25 and 50 percent of said first and second stitching yarns are interwoven with said top machine direction yarns as reversed picks.

10. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein pairs of first and second stitching yarns are positioned between pairs of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns, and wherein between 25 and 50 percent of adjacent pairs of first and second stitching yarns are interwoven as reversed picks;

wherein each of said top cross machine direction yarns passes over a first group of alternate top machine direction yarns and under a second group of alternate top machine direction yarns, with each of said yarns of said first group being positioned between a pair of yarns of said second group, and with each of said yarns of said second group being positioned between a pair of yarns of said first group, and wherein a pair of first and second stitching yarns is positioned between each pair of top cross machine direction yarns, and wherein said fiber support portions of said first and second stitching yarns pass under said first set of alternate top machine direction yarns and over said second set of alternate top machine direction yarns, such that said top machine direction yarns, said top cross machine direction yarns, and said fiber support portions of said first and second stitching yarns form a plain weave pattern;

wherein said fiber support portions of said first stitching yarns pass over a first number of said machine direction yarns, said fiber support portions of said second stitching yarns pass over a second number of said machine direction yarns, and said first number differs from said second number.

11. The papermaker's fabric defined in claim 10, wherein said first number is larger than said second number, and wherein said second stitching yarn has a higher modulus of elasticity than said first stitching yarn.

12. The papermaker's fabric defined in claim 10, wherein said first number is three, and second number is two.

13. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein pairs of first and second stitching yarns are positioned between pairs of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns, and wherein between 25 and 50 percent of adjacent pairs of first and second stitching yarns are interwoven as reversed picks;

wherein said repeat unit includes 12 top machine direction yarns and 12 bottom machine direction yarns.

14. A method of making paper, said method comprising the steps of:

(a) providing a papermaker's fabric comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns;

wherein each of said top cross machine direction yarns passes over a first group of alternate top machine direction yarns and under a second group of alternate top machine direction yarns, with each of said yarns of said first group being positioned between a pair of yarns of said second group, and with each of said yarns of said second group being positioned between a pair of yarns of said first group, and wherein said fiber support portions of said first and second stitching yarns pass under said first set of alternate top machine direction yarns and over said second set of alternate top machine direction yarns, such that said top machine direction yarns, said top cross machine direction yarns, and said fiber support portions of said first and second stitching yarns form a plain weave pattern;

wherein said fiber support portions of said first stitching yarns pass over a first number of said machine direction yarns, said fiber support portions of said second stitching yarns pass over a second number of said machine direction yarns, and said first number differs from said second number;

(b) applying paper stock to said papermaker's fabric; and (c) removing moisture from said paper stock.

15. A method of making paper, said method comprising the steps of:

(a) providing a papermaker's fabric comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:

a set of top machine direction yarns;

a set of top cross machine direction yarns interwoven with said set of top machine direction yarns;

a set of bottom machine direction yarns;

a set of bottom cross machine direction yarns interwoven with said set of bottom machine direction yarns;

wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of aid binding portions of said first and second stitching yarns passes below at least one of said bottom machine direction yarns;

wherein said top machine direction yarns and said top cross machine direction yarns are interwoven in a repeating pattern such that each of said top cross machine direction yarns passes over a first pair of adjacent top machine direction yarns, under a third top machine direction yarn adjacent to said first pair, and over a second pair of top machine direction yarns positioned adjacent said third top machine direction yarn, and wherein adjacent top cross machine direction yarns pass over top machine direction yarn pairs that are offset by two top machine direction yarns, and wherein said stitching yarns are interwoven with said top machine direction yarns in a repeating pattern such that said fiber support portion of each of said first and second stitching yarns passes over a third pair of adjacent top machine direction yarns, under an adjacent top machine direction yarn, and over a fourth pair of adjacent machine direction yarns, then passes under said transitional top machine direction yarn, said third and fourth pairs of top machine direction yarns being offset from said first and second pairs by one machine direction yarn, such that said top machine direction yarns, said cross machine direction yarns, and said fiber support portions of said first and second stitching yarns form a 1×2 twill pattern;

(b) applying paper stock to said papermaker's fabric; and (c) removing moisture from said paper stock.

*16. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:*

*a set of top machine direction yarns;*

*a set of top cross machine direction yarns interwoven with said set of top machine direction yarns;*

*a set of bottom machine direction yarns;*

*a set of bottom cross machine direction yarns interwoven with said set of bottom machine direction yarns; and*

*wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is posi-*

*tioned below said top machine direction yarns, and such that said first and second stitching yarns cross each other as they pass below a transitional top machine direction yarn, and such that each of said binding portions of said first and second stitching yarns passes below at least one of said bottom machine direction yarns to form a bottom side stitching yarn knuckle; and*

*wherein each of said bottom machine direction yarns form bottom side machine direction knuckles as they interweave with said bottom cross machine direction yarns, and said bottom side stitching yarn knuckles are positioned below one of said bottom side machine direction yarns to be substantially centered between adjacent bottom side machine direction knuckles on that bottom machine direction yarn.*

*17. The papermaker's fabric defined in claim 16, wherein said repeat unit of said fabric includes 10 bottom machine direction yarns and 10 bottom cross machine direction yarns.*

*18. The papermaker's fabric defined in claim 17, wherein each of said bottom machine direction yarns passes, in order, above four consecutive bottom cross machine direction yarns, below a bottom cross machine direction yarn to form a first bottom side machine direction knuckle, above four consecutive bottom cross machine direction yarns, and below a bottom cross machine direction yarn to form a second side machine direction knuckle, and wherein a stitching yarn forms a bottom side stitching yarn knuckle below said machine direction yarn between the second and third of each of said four consecutive bottom cross machine direction yarns.*

*19. The papermaker's fabric defined in claim 18, wherein each bottom machine direction yarn is offset from each adjacent bottom machine direction yarn by three bottom cross machine direction yarns, with the result that bottom side machine direction yarn knuckles are formed below the bottom cross machine direction yarns that sandwich the stitching yarn pair forming a stitching yarn knuckle below the bottom machine direction yarn.*

*20. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:*

*a set of top machine direction yarns;*

*a set of top cross machine direction yarns interwoven with said set of top machine direction yarns;*

*a set of bottom machine direction yarns;*

*a set of bottom cross machine direction yarns interwoven with said set of bottom machine direction yarns;*

*wherein a pair of first and second stitching yarns is positioned between each adjacent pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns to form a bottom side stitching yarn knuckle;*

*wherein each of said bottom machine direction yarns form bottom side machine direction knuckles as they interweave with said bottom cross machine direction yarns, and wherein each bottom machine direction yarn is offset from each adjacent bottom machine direction yarn such that, for each bottom machine direction yarn, bottom side machine direction yarn knuckles are formed by adjacent bottom machine direction yarns below the bottom cross machine direction yarns that sandwich each stitching yarn pair that forms a stitching yarn knuckle below the bottom machine direction yarn.*

*21. The papermaker's fabric defined in claim 20, wherein said repeat unit of said fabric includes 10 bottom machine direction yarns and 10 bottom cross machine direction yarns.*

*22. The papermaker's fabric defined in claim 21, wherein said bottom cross machine direction yarns are offset from one another by three machine direction yarns.*

*23. The papermaker's fabric defined in claim 22, wherein each of said bottom machine direction yarns passes, in order, above four consecutive bottom cross machine direction yarns, below a bottom cross machine direction yarn to form a first bottom side machine direction knuckle, above four consecutive bottom cross machine direction yarns, and below a bottom cross machine direction yarn to form a second side machine direction knuckle, and wherein a stitching yarn forms a bottom side stitching yarn knuckle below said machine direction yarn between the second and third of each of said four consecutive bottom cross machine direction yarns.*

*24. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:*

*a set of top machine direction yarns;*

*a set of top cross machine direction yarns interwoven with said set of top machine direction yarns;*

*a set of bottom machine direction yarns;*

*a set of bottom cross machine direction yarns interwoven with said set of bottom machine direction yarns;*

*wherein pairs of first and second stitching yarns are positioned between each pair of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns;*

*and wherein each of said first stitching yarns passes over a first number of top machine direction yarns, and each of said second stitching yarns passes over a second number of top machine direction yarns, said first number being different than said second number; and*

*and wherein at least some of the top cross machine direction yarns are immediately adjacent to either two first stitching yarns or two second stitching yarns.*

*25. The papermaker's fabric defined in claim 24, wherein, beginning with a selected top cross machine direction yarn and moving in one direction parallel to the machine direction for the length of the full repeat unit, between 25 and 50 percent of the first stitching yarns are nearer to said selected top cross machine direction yarn that the second stitching yarns of their respective pairs.*

*26. The papermaker's fabric defined in claim 25, wherein between 40 and 50 percent of the first stitching yarns are nearer to said selected top machine direction yarn than the second stitching yarns of their respective pairs.*

*27. The papermaker's fabric defined in claim 25, wherein all of the top cross machine direction yarns are immediately adjacent to either two first stitching yarns or two second stitching yarns.*

*28. The papermaker's fabric defined in claim 25, wherein said repeat unit includes 10 top machine direction yarns and 10 bottom machine direction yarns.*

*29. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:*

*a set of top machine direction yarns;*

*a set of top cross machine direction yarns interwoven with said set of top machine direction yarns;*

*a set of bottom machine direction yarns;*

*a set of bottom cross machine direction yarns interwoven with said set of bottom machine direction yarns;*

*wherein pairs of first and second stitching yarns are positioned between pairs of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns;*

*wherein, as stitching yarn pairs pass below transitional yarns, they form top side transitional stitching yarn knuckles, and in that, for at least some adjacent top side stitching yarn knuckles, first stitching yarns extending in one direction parallel to the cross machine direction from the transitional stitching yarn knuckles are woven nearer to one another than are the second stitching yarns of those pairs extending in the opposite direction parallel to the cross machine direction from the transitional stitching yarn knuckles.*

*30. The papermaker's fabric defined in claim 29, wherein said first stitching yarns are woven nearer to one another as they extend from adjacent top side transitional stitching yarn knuckles for at least 50 percent of said top side stitching yarn knuckles.*

*31. The papermaker's fabric defined in claim 29, wherein said first stitching yarns are woven nearer to one another as they extend from adjacent top side transitional stitching yarn knuckles for 100 percent of said top side stitching yarn knuckles.*

*32. The papermaker's fabric defined in claim 29, wherein a pair of first and second stitching yarns is positioned between each pair of adjacent top cross machine direction yarns.*

*33. The papermaker's fabric defined in claim 29, wherein said repeat unit includes 10 top machine direction yarns and 10 bottom machine direction yarns.*

*34. The papermaker's fabric defined in claim 29, wherein said repeat unit includes 12 top machine direction yarns and 12 bottom machine direction yarns.*

*35. A papermaker's fabric, comprising top machine direction yarns, top cross machine direction yarns, bottom machine direction yarns, bottom cross machine direction yarns, and sets of first and second stitching yarns, said fabric being formed in a plurality of repeating units, each of said repeating units comprising:*

*a set of top machine direction yarns;*

*a set of top cross machine direction yarns interwoven with said set of top machine direction yarns;*

*a set of bottom machine direction yarns;*

*a set of bottom cross machine direction yarns interwoven with said set of bottom machine direction yarns;*

*wherein pairs of first and second stitching yarns are positioned between pairs of top cross machine direction yarns, said first and second stitching yarns of each pair being interwoven with said top and bottom machine direction yarns such that, as a fiber support portion of said first stitching yarn is interweaving with said top machine direction yarns, a binding portion of said second stitching yarn is positioned below said top machine direction yarns, and such that as a fiber support portion of said second stitching yarn is interweaving with said top machine direction yarns, a binding portion of said first stitching yarn is positioned below said top machine direction yarns, and such that said first and second stitching yarns cross each other as they pass below a transitional top machine direction yarn, and such that each of said binding portions of said first and second stitching yarns passes below at least one of said bottom machine direction yarns, said first stitching yarns passing above a first number of top machine direction yarns, and said second stitching yarns passing above a second number of top machine direction yarns, said second number being different from said first number;*

*wherein, as stitching yarn pairs pass below transitional yarns, they form top side transitional stitching yarn knuckles, and in that, for at least some adjacent top side stitching yarn knuckles, first stitching yarns extending in one direction parallel to the cross machine direction from the transitional stitching yarn knuckles are woven nearer to one another than are the second stitching yarns of those pairs extending in the opposite direction parallel to the cross machine direction from the transitional stitching yarn knuckles.*

*36. The papermaker's fabric defined in claim 35, wherein said first stitching yarns are woven nearer to one another as*

*they extend from adjacent top side transitional stitching yarn knuckles for at least 50 percent of said top side stitching yarn knuckles.*

*37. The papermaker's fabric defined in claim 35, wherein said first stitching yarns are woven nearer to one another as they extend from adjacent top side transitional stitching yarn knuckles for 100 percent of said top side stitching yarn knuckles.*

*38. The papermaker's fabric defined in claim 35, wherein a pair of first and second stitching yarns is positioned between each pair of adjacent top cross machine direction yarns.*

*39. The papermaker's fabric defined in claim 35, wherein said repeat unit includes 10 top machine direction yarns and 10 bottom machine direction yarns.*

* * * * *

UNITED STATES PATENT AND TRADEMARK OFFICE

CERTIFICATE OF CORRECTION

PATENT NO. : RE 40,066 E
APPLICATION NO. : 09/982917
DATED : February 19, 2008
INVENTOR(S) : Ward It is certified that error appears in the above-identified patent and that said Letters Patent is hereby corrected as shown below:

On Title Page:

Item 22: Please correct Filing date "Aug. 21, 2002"
To read -- Oct. 18, 2001 --

In the Claims:

Column 12, Claim 1, Line 49: Please correct "yarn form"
To read -- yarns form --

Column 13, Claim 5, Line 25: Please correct "portion of said"
To read -- portions of said --

Column 14, Claim 7, Line 7: Please correct "yarn is"
To read -- yarns is --

Column 15, Claim 8, Lines 12 and 19: Please correct "traditional top"
To read -- transitional top --

Column 18, Claim 15, Line 13: Please correct "each of aid"
To read -- each of said --

Column 21, Claim 25, Line 14: Please correct "direction yarn that"
To read -- direction yarn than --

Signed and Sealed this

Third Day of June, 2008

JON W. DUDAS
*Director of the United States Patent and Trademark Office*